United States Patent
White et al.

(10) Patent No.: US 11,102,346 B2
(45) Date of Patent: Aug. 24, 2021

(54) PROVIDING ADDITIONAL INFORMATION TO CALLED PARTIES

(71) Applicant: ACCUDATA TECHNOLOGIES, INC., Allen, TX (US)

(72) Inventors: James N. White, Dallas, TX (US); Monica Rose Martino, Plano, TX (US); M. Gregory Smith, Fairview, TX (US)

(73) Assignee: FIRST ORION CORP., Little Rock, AR (US)

( * ) Notice: Subject to any disclaimer, the term of this patent is extended or adjusted under 35 U.S.C. 154(b) by 0 days.

(21) Appl. No.: 16/379,736

(22) Filed: Apr. 9, 2019

(65) Prior Publication Data

US 2019/0238678 A1    Aug. 1, 2019

Related U.S. Application Data (63) Continuation of application No. 15/799,179, filed on Oct. 31, 2017, now Pat. No. 10,257,348, which is a continuation of application No. 15/156,793, filed on May 17, 2016, now Pat. No. 9,807,231, which is a continuation of application No. 14/791,456, filed on Jul. 5, 2015, now Pat. No. 9,350,855, which is a continuation of application No. 14/136,213, filed on Dec. 20, 2013, now Pat. No. 9,106,743, which is a continuation of application No. 11/974,983, filed on Oct. 17, 2007, now Pat. No. 8,625,762.

(60) Provisional application No. 60/934,407, filed on Jun. 13, 2007.

(51) Int. Cl.
| | |
|---|---|
| H04M 1/56 | (2006.01) |
| H04M 15/06 | (2006.01) |
| H04M 3/42 | (2006.01) |
| H04M 3/436 | (2006.01) |
| H04W 4/16 | (2009.01) |
| H04W 4/90 | (2018.01) |

(52) U.S. Cl.
CPC ... *H04M 3/42068* (2013.01); *H04M 3/42042* (2013.01); *H04M 3/42059* (2013.01); *H04M 3/436* (2013.01); *H04W 4/16* (2013.01); *H04W 4/90* (2018.02)

(58) Field of Classification Search
None
See application file for complete search history.

(56) References Cited

U.S. PATENT DOCUMENTS

| | | |
|---|---|---|
| 5,165,095 A | 11/1992 | Borcherding |
| 5,311,569 A | 5/1994 | Brozovich et al. |
| 5,651,055 A | 7/1997 | Argade |
| 5,940,484 A | 8/1999 | DeFazio et al. |

(Continued)

*Primary Examiner* — Quoc D Tran (57) ABSTRACT

A system, method, and computer readable medium for providing additional information to called parties comprises receiving a call from a calling party, performing a lookup of information associated with the calling party in a database, receiving the information from the database, and forwarding the information to a called party. The system comprises at least one device for receiving a call from a calling party, and at least one database for storing information associated with the calling party, wherein the at least one device is operable to perform a lookup of information associated with the calling party in a database, receive the information from the database, and forward the information to a called party.

20 Claims, 4 Drawing Sheets

(56) References Cited

U.S. PATENT DOCUMENTS

| | | | |
|---|---|---|---|
| 5,970,143 A | 10/1999 | Schneier et al. | |
| 6,014,426 A | 1/2000 | Drysdale et al. | |
| 6,240,175 B1 | 5/2001 | Barber | |
| 6,298,128 B1 | 10/2001 | Ramey et al. | |
| 6,341,161 B1 | 1/2002 | Latter et al. | |
| 6,353,664 B1 | 3/2002 | Cannon et al. | |
| 6,449,351 B1 | 9/2002 | Moss et al. | |
| 6,459,782 B1 | 10/2002 | Bedrosian et al. | |
| 6,496,569 B2 | 12/2002 | Pelletier et al. | |
| 6,539,080 B1 | 3/2003 | Bruce et al. | |
| 6,608,886 B1 * | 8/2003 | Contractor | H04M 11/04 379/37 |
| 6,658,455 B1 | 12/2003 | Weinman | |
| 6,721,406 B1 | 4/2004 | Contractor | |
| 6,920,206 B2 | 7/2005 | Basore et al. | |
| 6,940,954 B1 | 9/2005 | Toebes | |
| 6,950,504 B1 * | 9/2005 | Marx | H04M 1/578 379/88.19 |
| 6,970,543 B2 | 11/2005 | Lautenschlager et al. | |
| 7,024,556 B1 | 4/2006 | Hadjinikitas et al. | |
| 7,127,237 B2 | 10/2006 | Naruse et al. | |
| 7,200,212 B2 | 4/2007 | Gosselin | |
| 7,248,677 B2 * | 7/2007 | Randall | H04M 3/42042 379/93.23 |
| 7,269,413 B2 | 9/2007 | Kraft | |
| 7,840,689 B2 | 11/2010 | Stewart | |
| 7,864,940 B1 | 1/2011 | Harvey et al. | |
| 7,869,792 B1 | 1/2011 | Zhou et al. | |
| 7,899,921 B2 | 3/2011 | Hill et al. | |
| 8,005,195 B2 | 8/2011 | Luneau et al. | |
| 8,068,825 B2 | 11/2011 | Mikan et al. | |
| 8,081,992 B2 | 12/2011 | Book | |
| 8,095,647 B2 | 1/2012 | Stewart | |
| 8,099,780 B2 | 1/2012 | Lu | |
| 8,103,868 B2 | 1/2012 | Christensen | |
| 8,199,733 B2 | 6/2012 | Stewart | |
| 8,250,204 B2 | 8/2012 | Stewart | |
| 8,255,539 B2 | 8/2012 | Pierlot et al. | |
| 8,295,819 B1 | 10/2012 | Kaplan et al. | |
| 8,300,787 B2 | 10/2012 | Frank | |
| 8,331,899 B2 | 12/2012 | Broms | |
| 8,417,763 B2 | 4/2013 | Stewart | |
| 8,437,460 B2 | 5/2013 | Daniell et al. | |
| 8,447,018 B2 | 5/2013 | Martino et al. | |
| 8,548,140 B2 | 10/2013 | Martino et al. | |
| 8,625,762 B1 | 1/2014 | White et al. | |
| 8,861,697 B2 | 10/2014 | Martino et al. | |
| 8,879,702 B1 | 11/2014 | White et al. | |
| 9,008,292 B2 | 4/2015 | Martino et al. | |
| 9,036,797 B2 | 5/2015 | Martino et al. | |
| 9,106,743 B2 | 8/2015 | White et al. | |
| 9,197,740 B2 | 11/2015 | White et al. | |
| 9,350,855 B2 | 5/2016 | White et al. | |
| 9,392,107 B2 | 7/2016 | Martino et al. | |
| 9,496,569 B2 | 11/2016 | Gangwar | |
| 9,497,306 B2 | 11/2016 | Martino et al. | |
| 9,674,346 B2 | 6/2017 | White et al. | |
| 9,838,535 B2 | 12/2017 | Martino et al. | |
| 10,091,342 B2 | 10/2018 | Martino et al. | |
| 10,148,813 B2 | 12/2018 | White et al. | |
| 10,257,348 B2 * | 4/2019 | White | H04W 4/90 |
| 10,262,281 B1 | 4/2019 | Vitek et al. | |
| 10,397,387 B2 | 8/2019 | Martino et al. | |
| 10,455,083 B2 | 10/2019 | White et al. | |
| 2002/0018546 A1 | 2/2002 | Horne | |
| 2002/0057764 A1 * | 5/2002 | Salvucci | H04W 4/90 379/37 |
| 2002/0067807 A1 | 6/2002 | Danner et al. | |
| 2002/0120505 A1 | 8/2002 | Henkin et al. | |
| 2002/0172336 A1 | 11/2002 | Postma et al. | |
| 2003/0027559 A1 | 2/2003 | Umstetter et al. | |
| 2003/0086558 A1 | 5/2003 | Seelig et al. | |
| 2003/0112938 A1 | 6/2003 | Kanakubo et al. | |
| 2003/0128821 A1 * | 7/2003 | Luneau | H04M 1/573 379/88.21 |
| 2003/0130894 A1 | 7/2003 | Huettner et al. | |
| 2003/0144876 A1 | 7/2003 | Kosinski et al. | |
| 2003/0177347 A1 | 9/2003 | Schneier et al. | |
| 2003/0198323 A1 | 10/2003 | Watanabe | |
| 2004/0044912 A1 | 3/2004 | Connary et al. | |
| 2004/0067751 A1 | 4/2004 | Vandermeijden et al. | |
| 2004/0096042 A1 | 5/2004 | Orwick et al. | |
| 2004/0148342 A1 | 7/2004 | Cotte | |
| 2004/0228456 A1 | 11/2004 | Glynn et al. | |
| 2004/0261126 A1 | 12/2004 | Addington et al. | |
| 2005/0074109 A1 | 4/2005 | Hanson et al. | |
| 2005/0084085 A1 | 4/2005 | Silver et al. | |
| 2005/0160144 A1 | 7/2005 | Bhatia | |
| 2005/0172154 A1 | 8/2005 | Short et al. | |
| 2005/0182675 A1 | 8/2005 | Huettner | |
| 2005/0198099 A1 | 9/2005 | Motsinger et al. | |
| 2005/0240432 A1 | 10/2005 | Jensen | |
| 2005/0243975 A1 | 11/2005 | Reich et al. | |
| 2005/0286687 A1 | 12/2005 | Sanmugasuntharam et al. | |
| 2005/0286691 A1 | 12/2005 | Taylor et al. | |
| 2006/0025112 A1 | 2/2006 | Hamanaga et al. | |
| 2006/0026277 A1 * | 2/2006 | Sutcliffe | H04M 19/04 709/224 |
| 2006/0031553 A1 | 2/2006 | Kim | |
| 2006/0072713 A1 | 4/2006 | Fernandes et al. | |
| 2006/0085519 A1 | 4/2006 | Goode et al. | |
| 2006/0123119 A1 | 6/2006 | Hill et al. | |
| 2006/0166658 A1 | 7/2006 | Bennett et al. | |
| 2006/0184684 A1 | 8/2006 | Weiss et al. | |
| 2006/0248209 A1 | 11/2006 | Chiu et al. | |
| 2006/0293057 A1 | 12/2006 | Mazerski et al. | |
| 2006/0294465 A1 | 12/2006 | Ronen et al. | |
| 2007/0033419 A1 | 2/2007 | Kocher et al. | |
| 2007/0064886 A1 | 3/2007 | Chiu et al. | |
| 2007/0071201 A1 | 3/2007 | Pettus et al. | |
| 2007/0094082 A1 | 4/2007 | Yruski et al. | |
| 2007/0127656 A1 | 6/2007 | Citron et al. | |
| 2007/0133771 A1 | 6/2007 | Stifelman et al. | |
| 2007/0195942 A1 | 8/2007 | Woodring | |
| 2007/0206736 A1 | 9/2007 | Sprigg et al. | |
| 2007/0207781 A1 | 9/2007 | Sprigg et al. | |
| 2007/0248221 A1 * | 10/2007 | Chatterjee | H04M 3/4234 379/211.02 |
| 2007/0271596 A1 | 11/2007 | Boubion et al. | |
| 2007/0280445 A1 | 12/2007 | Shkedi | |
| 2008/0005325 A1 | 1/2008 | Wynn et al. | |
| 2008/0070609 A1 | 3/2008 | Ackley | |
| 2008/0084975 A1 | 4/2008 | Schwartz | |
| 2008/0089501 A1 | 4/2008 | Benco et al. | |
| 2008/0091796 A1 | 4/2008 | Story et al. | |
| 2008/0101298 A1 | 5/2008 | Tasker | |
| 2008/0140714 A1 | 6/2008 | Rhoads et al. | |
| 2008/0159318 A1 | 7/2008 | Pierlot et al. | |
| 2008/0177616 A1 | 7/2008 | Nemirofsky et al. | |
| 2008/0240383 A1 * | 10/2008 | Fronczak | H04M 1/57 379/88.19 |
| 2008/0246605 A1 | 10/2008 | Pfeffer et al. | |
| 2008/0260135 A1 | 10/2008 | Siegrist | |
| 2009/0177303 A1 | 7/2009 | Logan et al. | |
| 2009/0234578 A1 | 9/2009 | Newby et al. | |
| 2011/0007885 A1 | 1/2011 | Kirchhoff et al. | |
| 2011/0013755 A1 | 1/2011 | Martino et al. | |
| 2011/0087744 A1 | 4/2011 | Deluca et al. | |
| 2011/0105091 A1 | 5/2011 | Jones | |
| 2012/0226756 A1 | 9/2012 | Lindquist et al. | |
| 2012/0230479 A1 | 9/2012 | Martin | |
| 2012/0243675 A1 | 9/2012 | Diroo et al. | |
| 2014/0003589 A1 | 1/2014 | Martino et al. | |
| 2014/0122506 A1 | 5/2014 | Jebara et al. | |
| 2014/0282759 A1 | 9/2014 | Harvey et al. | |

\* cited by examiner

PROVIDING ADDITIONAL INFORMATION TO CALLED PARTIES

FIELD OF THE INVENTION

The present disclosure is generally related to a communications network, and more particularly to providing additional information to called parties in a communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. In addition, although Caller ID can be blocked by prefixing a call with *67, for example, ANI is (usually) impossible to block. ANI was originally developed for telephone company billing purposes and is now offered to commercial customers who may benefit from knowing who is calling them. In addition, ANI is one of the core technologies behind the 911 emergency service.

In commercial applications, a user may have an integrated or extraneous display affixed to a telephone. Such a display presents the ANI or telephone number of the calling party. In addition, the display may present the caller's name or calling name, also known as CNAM. Typically, no other information is presented other than the calling party telephone number and/or name. As such, what is needed is a system, method, and computer readable medium that can provide additional information to called parties.

SUMMARY OF THE INVENTION

A method for providing additional information to a called party in a communications network is provided. A call is received from a calling party. A lookup of information relating to the calling party is performed in a database based on an identifier of the calling party. The information is provided to a called party if the information is located in the database.

A method for providing additional information to a called party in a communications network is provided. In one embodiment, a call is received from a calling party. A lookup of information relating to the calling party is performed in a database based on an identifier of the calling party. The information is provided to a called party if the information is located in the database.

In an alternative embodiment, a call is received from a calling party. A lookup of information associated with the calling party is performed in a database. The information is received from the database. The information is forwarded to a called party. The information may comprise a name of the calling party. A query is sent with the name to the database. A determination is made as to whether the name is located in the database. If the name is located in the database, information associated with the calling party is returned.

The call may also comprise a number of the called party and the information may comprise information intended for the called party. A query is sent with the number to the database. A determination is made as to whether the information associated with the calling party is intended for the called party based on the number. If the information is intended for the called party, the information is returned. However, if the information is not intended for the called party, generic information is returned.

A system for providing additional information to a called party is provided. The system comprises at least one device for receiving a call from a calling party, and at least one database for storing information associated with the calling party. The at least one device is operable to perform a lookup of information associated with the calling party in a database, receive the information from the database, and forward the information to a called party. The at least one device further comprises at least one telephone wire port for receiving the call from the calling party, at least one of an Ethernet port or a universal serial bus port for receiving the information from the database, and at least one of a wireless access port for forwarding the information to the called party.

A computer readable medium is provided that comprises instructions for performing a lookup of information in a database relating to a calling party based on an identifier of the calling party, providing the information to a called party if the information is located in a device of the called party, wherein the information comprises a name of the calling party and informative and promotional information from a service provider.

DETAILED DESCRIPTION OF THE INVENTION

The present invention provides additional information to a called party or called parties. In the context of the present disclosure, a calling party is a party initiating or sending a call. A called party is a party receiving the call. Such a process is initiated when a calling party contacts a called party wherein the calling party and the called party each use at least one electronic device and the called party is able to receive ANI or Caller ID service and is able to display related information to such a service or to a related service. The at least one electronic device is at least one of a computer, a server, a wireless phone, an Internet Protocol (IP) enabled phone, or a device that can receive and/or transmit information. The computer readable medium (or software) of the present invention is stored on and/or runs on at least one of the above mentioned electronic devices.

Figure 1:
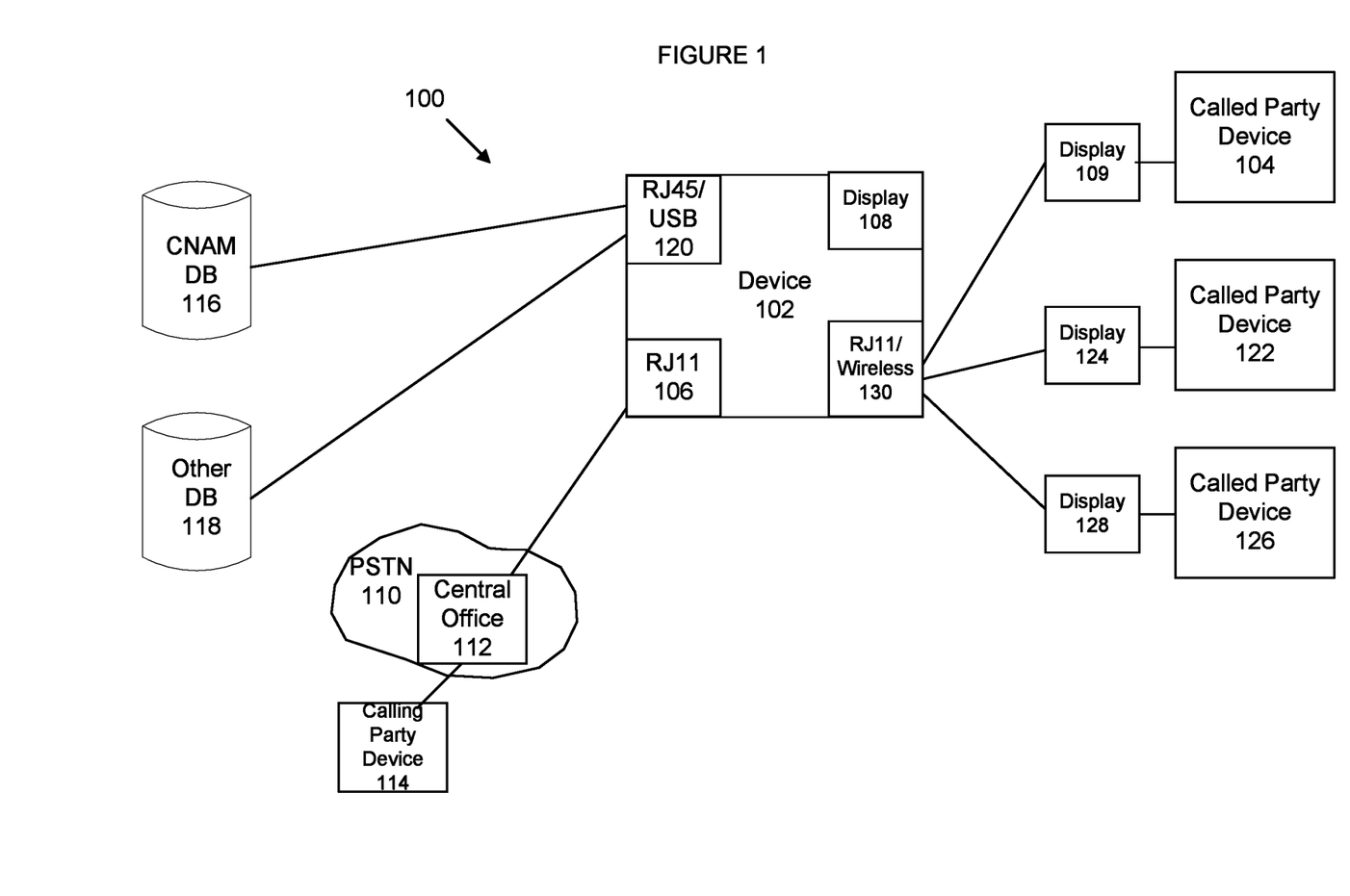
FIG. 1 depicts a system for providing additional information to called parties in accordance with one embodiment of the present invention.

FIG. 1 depicts a system 100 for providing additional information to called parties in accordance with one embodiment of the present invention. System 100 includes a device 102, which is able to send information to a called party device 104. Called party device 104 may be communicably coupled to device 102 via an RJ 11 (telephone wire) port or a wireless port 130 and is able to display information on a display 108. In this embodiment, the display 108 is integrated within device 102. However, display 108 may be implemented as a standalone device without departing from the spirit and scope of the present disclosure. Further, the device 102 may be connected to the one or more displays via a wireless connection.

In addition, device 102 may receive information from a plurality of sources including public switched telephone network (PSTN) 110 which includes a central office 112 which is coupled to a calling party device 114. The information may be received by a RJ11 (telephone wire) port 106 of device 102. Other sources include a wireless network or data network (not shown) supporting other devices such as a computer or IP enabled phones. Currently, information received by device 102 may include telephone number of the calling party and the calling party name (CNAM). However, no additional information is received from the calling party.

Aspects of the present invention provide additional information to called parties, such as called party device 104, by providing an ability to retrieve calling party information from a CNAM database 116 and/or other database 118. CNAM database 116 and other database 118 comprise information relating to the calling party, for example, calling party name, telephone number, messages, location, and other information associated with the calling party. When a calling party initiates a call using calling party device 114, calling party device 114 sends an automatic number identification (ANI) or other identifier of the calling party to RJ11 (telephone wire) port 106 of device 102. An example of another identifier may include an IP address of the calling party device 114 or a unique identifier of the calling party that can be received and transmitted by the calling party device 114.

In response to receiving the ANI or other identifier, device 102 sends a query for the calling party name to CNAM database 116 and/or other database 118. The query may be sent via the RJ45 (Ethernet) port or a USB port 120 of device 102 to databases 116 or 118 via a direct connection or via a data network (not shown). Once the query is received, a lookup is performed in CNAM database 116 or other database 118 for the calling party name. If the calling party name is found, the CNAM database 116 or other database 118 returns the calling party name and additional information associated with the calling party to device 102. Upon receiving the information, device 102 may display it on display 108. In addition, device 102 may send the information to other called party devices, such as called party devices 104, 122, and 126, to be contemporaneously displayed on displays 109, 124, and 128 respectively. In this example, displays 109, 124, and 128 are implemented as standalone devices. In other embodiments, the displays 109, 124, and 128 can be communicably coupled to called party devices 104, 122, and 126 or may be integrated with called party devices 104, 122 and 126 without departing the spirit and scope of the present disclosure. The information may be sent from the RJ11 (telephone wire) port of device 102 or via wireless connection 130. However, if the calling name is not found, a lookup is performed in other databases (not shown) to determine where the ANI or identifier of the calling party is stored. Once the ANI or identifier is located, the calling party information may be provided to device 102.

Figure 2:
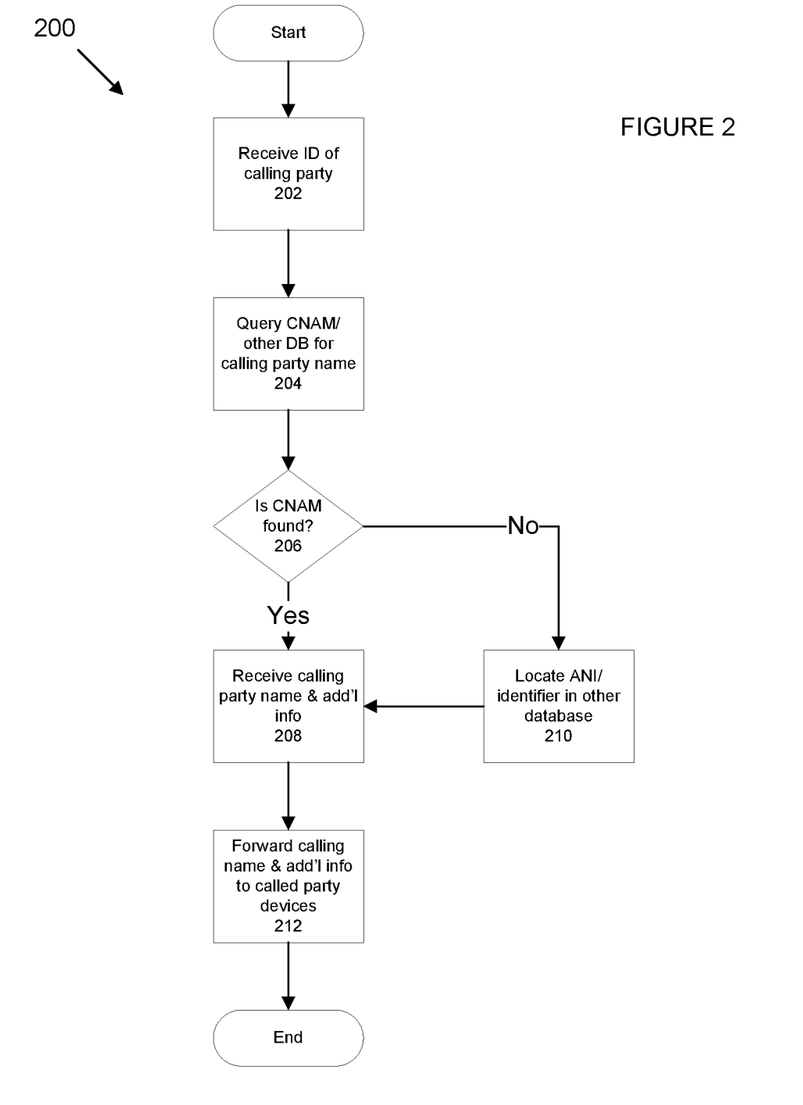
FIG. 2 depicts a flowchart of a method or a computer readable medium for providing additional information to called parties in accordance with one embodiment of the present disclosure.

Referring to FIG. 2, a flowchart of a method or computer readable medium for providing additional information to called parties is depicted in accordance with one embodiment of the present disclosure. In this example, process 200 may be implemented as instructions executed within device 102. Process 200 begins at step 202 with receiving an ANI or identifier of the calling party from a calling party device. The ANI or identifier may be received at an RJ11 or other port of device 102. Next, process 200 continues to step 204 to query CNAM database 116 or other database 118 for the calling party name based on the ANI or identifier. The query may be sent via RJ45, USB, or other port of device 102. Process 200 then continues to step 206 to determine if the calling party name is found in the CNAM database 116 or other database 118. If the calling party name is found in the database, process 200 continues to step 208 to receive the calling party name and additional information associated with the calling party. The information may be received at RJ45, USB, or other port 120 of device 102. Process 200 then completes at step 212 to forward the calling party name and additional information to other called party devices. The information may be forwarded from the RJ11 or other port of device 102 or via a wireless connection 130.

If the calling party name is not found in the database, process 200 continues to step 210 to locate the ANI or identifier of the calling party in other databases or locations. Process 200 then continues to step 208 to receive the calling party name and additional information associated with the calling party and to step 212 to forward the calling party name and additional information to other called party devices.

In addition to sending additional information to called parties, aspects of the present invention may provide specific information to called parties by providing the ability to retrieve information intended for the called party from the CNAM database 116 or other database 118. When the calling party initiates a call using calling party device 114, the calling party device 114 sends the called number of the called party device to CNAM database 116 or other database 118. Upon receiving the called number of the called party device, a lookup is performed in the CNAM database 116 or other database 118 for additional information intended for the called party based on the called number.

If additional information intended for the called party is found in the CNAM database 116 or other database 118, the CNAM database 116 or other database 118 returns the additional information specific to the called number to device 102. Upon receiving the information, device 102 may display it on display 108. In addition, device 102 may send the information to other called party devices, such as called party devices 104, 122, and 126, to be displayed on displays 109, 124 and 128 respectively. The information may be sent from the RJ11 or other port of the device 102 or via a wireless connection 130. In this way, additional information specific to a called party may be sent based on the called number. However, if called number is not found in the CNAM database 116 or other database 118, the CNAM database 116 or other database 118 may return a generic message to the device 102, which in turn sends it to called party devices 104, 122, and 126.

The additional information may be placed in the CNAM database 116, other database 118, or another location (not shown) accessible (either directly or indirectly) by the device 102, previous to, during, or after the calling party initiated call. Further, the additional information may be altered or appended to previous to, during, or after the calling party initiated call. This additional information can be placed directly by the entity controlling the databases 116, 118, or other location or directly by the entity providing the additional information.

Figure 3:
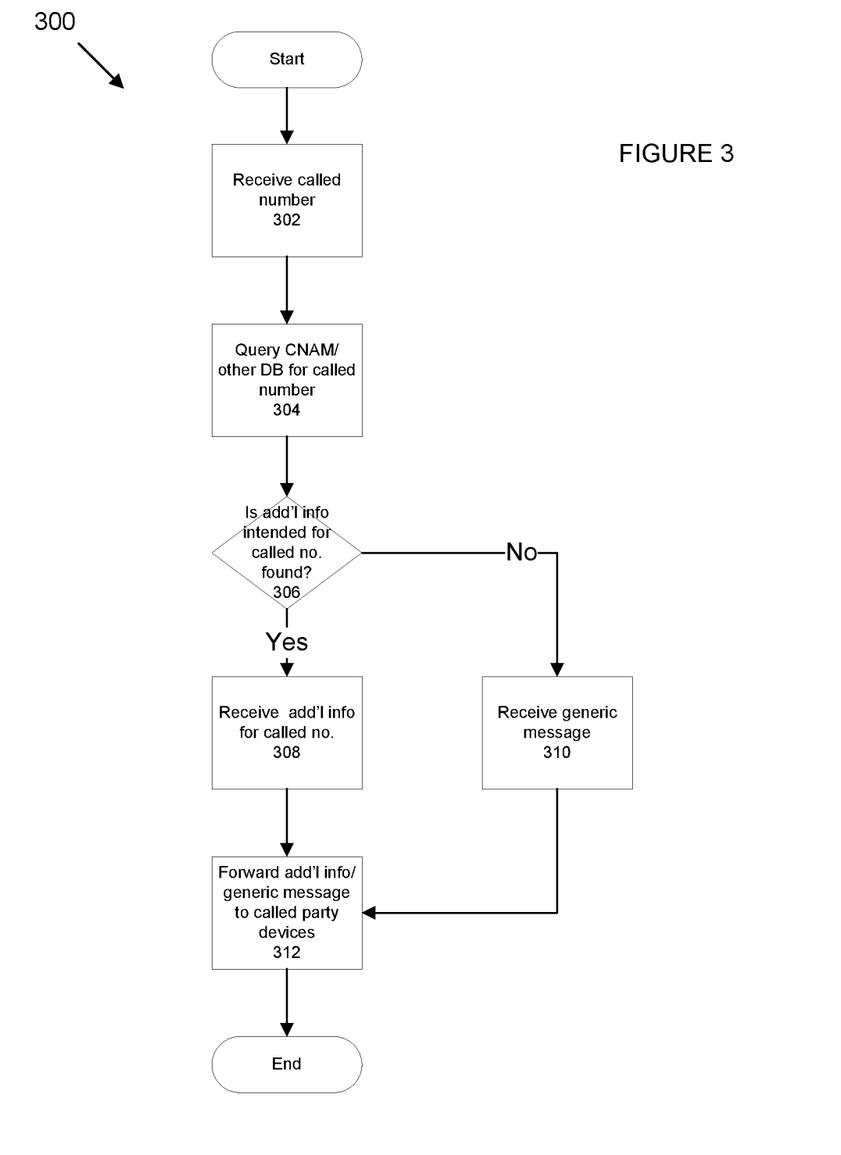
FIG. 3 depicts a flowchart of a method or a computer readable medium for providing additional information in accordance with an alternative embodiment of the present disclosure.

Referring to FIG. 3, a flowchart of a method or computer readable medium for providing additional information is depicted in accordance with an alternative embodiment of the present disclosure. In this example, process 300 may be implemented as instructions executing within device 102.

Process 300 begins at step 302 with receiving a called number from the calling party device 114. The called number may be received at the RJ11 or other port (not shown) of device 102. Next, process 302 continues to step 304 to query a CNAM database or other database for the called number. The query may be sent via an RJ45, USB, or other port of device 102.

Process 300 then continues to step 306 to determine if the additional information intended for the called party is found based on the called number. If no additional information intended for the called party is found based on the called number, process 300 continues to step 310 to receive a generic message from the database and to step 312 to forward the generic message to other called party devices.

However if additional information intended for the called party is found based on the called number, process 300 continues to step 308 to receive the additional information from the database. The information may be received at the RJ45, USB, or other port (not shown) of device 102. Process 300 then continues to step 312 to forward the additional information to other called party devices. The information may be forwarded from the RJ11 or other port of device 102 or via a wireless connection such as wireless connection 130. In this way, information specific to or customized for a called party may be delivered based on the called number.

In accordance with one embodiment of the present disclosure, the additional information intended for a called party may include alerts in response to an occurrence of an event. For example, a called party has ordered a refill of prescription from a pharmacy. When the prescription is ready for pickup, the pharmacy may initiate a call to the called party. In response, the CNAM database 116 or other database 118 may return a message to device 102 intended for the called party. The message may indicate that the prescription is ready for pickup in addition to the pharmacy's name and telephone number. Also, the message may include helpful information including directions to the pharmacy, operating hours of the pharmacy, allergic reactions to the prescription, web sites for additional information about the prescription and/or the affliction the prescription is intending to solve, links to such web sites that can be accessed directly from one or more of the displays, and coupons or codes for use with the prescription and/or for other items in the pharmacy that can be used in person and/or on-line.

Another alternative for additional information intended for a called party may include informative and promotional information from a service provider. For example, a called party is subscribed to television cable service from a cable company. The cable company may initiate a call upon issuance of a new bill to a called party. In response, the CNAM database 116 or other database 118 may return a message to device 102 intended for the called party. The message may indicate that a bill is ready for review in addition to the company's name and telephone number. In addition, the message may include promotional information, such as television shows that are scheduled for the evening or movies ready for order by the called party.

Yet another alternative for additional information intended for a called party may include situational information from an emergency service provider. For example, a tornado may be heading towards a called party. The emergency service provider, such as the police or fire department, may initiate a call to the device 102 which may be located at the called party's residence. In response, the CNAM database 116 or other database 118 may return an emergency message to device 102 intended for the called party. The message may indicate that a tornado is heading towards the residence in addition to the emergency service provider's name and telephone number. Also, the message may include the location and speed of the tornado based on the latest data and directions to nearby tornado shelters or other information related to the event. Also, the types of messages sent from the CNAM database 116 or other database 118 may be based on a seriousness of the situation. For example, a typical text message may be sent for less serious event while a text message in addition to a message that causes an LED or other light source (not shown) to flash on the device 102 may be sent for an emergency event. The message may be delivered in the form of a message, text, sound, graphic, video, and the like.

In other embodiments, the calling party can also send a voice message or initiate a live call to the called party before, during, or after the information is sent or received by the called party. For example, after the called party has received the information, the calling party can call, send an email to, or mail the called party regarding additional features or services that can be provided to the called party when the called party visits the retail establishment (or other entity) or based on the location of the called party. The device 102 also includes storage that can store the received information as well as a power adapter and/or a battery compartment that provides power to the device 102.

Figure 4:
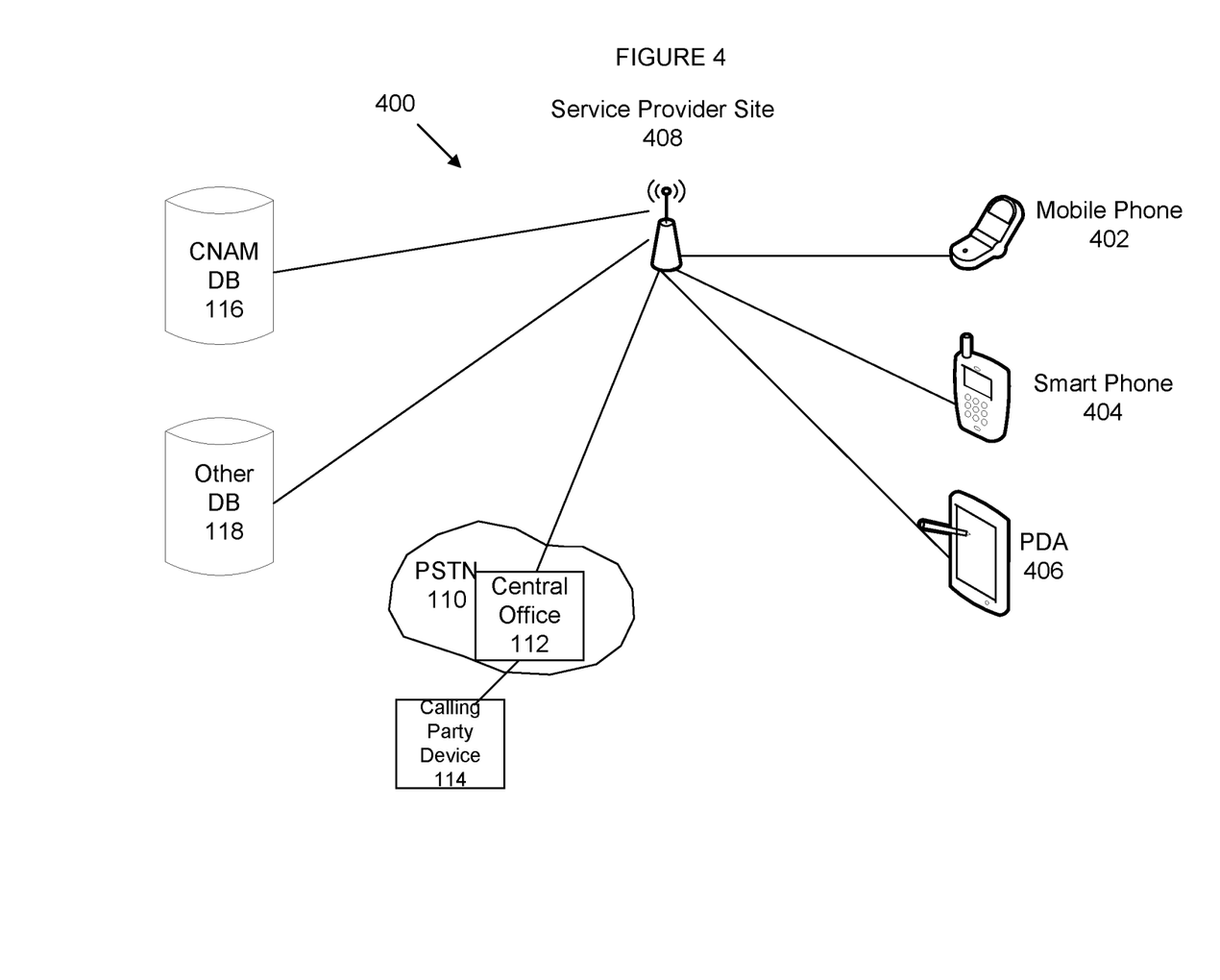
FIG. 4 depicts a system for providing additional information to called parties in accordance with an alternative embodiment of the present disclosure.

Furthermore, the device 102 may be implemented as a standalone device or an integrated device with other called party devices. Alternatively, the device 102 may be implemented as a mobile device with functionalities of both device 102 and called party devices 104, 122, and 126. Referring to FIG. 4, a system 400 for providing additional information to called parties is depicted in accordance with an alternative embodiment of the present disclosure. System 400 is similar to system 100 in FIG. 1, except that instead of device 102 being implemented as a standalone device. Device 102 is being implemented as a mobile phone 402, a smart phone 404, or a personal digital assistant (PDA) 406. To send and receive information to and from CNAM database 116 or other database 118, one or more of mobile devices 402, 404, and 406 are wired or wirelessly communicably coupled to a service provider site 408, which is also communicably coupled to databases 116 and 118 via a data network (not shown) and calling party device(s) 114 via PSTN 110.

In accordance with one embodiment of the present disclosure, aspects of the present disclosure are provided within mobile devices 402, 404, and 406. Thus, when calling party device 114 initiates a call to mobiles devices 402, 404, or 406, the service provider site 408 forwards the ANI or identifier of the calling party to devices 402, 404, or 406. The devices send a query message (or similar message) to CNAM database 116 or other database 118 via the service provider site 408. The query message may be sent by mobile devices using common wireless communication protocols. In response to identifying the calling party name, telephone number, or additional information intended for mobile devices 402, 404, or 406, CNAM database 116 or other database 118 returns the information to devices 402, 404, or 406 via the service provider site 408 using wireless communication protocols. Upon receiving the information, mobile devices 402, 404, or 406 may display the information to mobile users on displays or forward the information to other mobile devices or non-mobile devices (such as displays 109, 124, and 128) using wireless and wired communication protocols.

Although an exemplary embodiment of the system, method, and computer readable medium of the present disclosure has been illustrated in the accompanied drawings and described in the foregoing detailed description, it will be understood that the invention is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide additional information to called parties without departing from the spirit and scope of the present invention. Also, the additional information can be sent via at least one of a data network, the Internet, an Internet Protocol network, a wireless source, and a wired source and via a plurality of protocols. For example, the wireless connection between device 102 and other called party devices may be established via wireless protocols, such as TDMA, CDMA, 802.11b, 802.11g, or other types of wireless protocols.

What is claimed is:

1. A method, comprising:
    identifying, by a device, information associated with a calling party when a name of the calling party is located in a database;
    determining additional information exists for a called party device comprising an alert identifying occurrence of an event associated with the called party device;
    providing, by the device, the information associated with the calling party and the additional information associated with the called party device; and
    wherein the provided information and the additional information comprises a status associated with an existing order fulfilled by a service provider.

2. The method of claim 1, comprising:
    performing a lookup of the information associated with the calling party in the database, wherein the performing comprises:
        sending a query with the name of the calling party to the database.

3. The method of claim 1, comprising:
    performing a lookup of the information associated with the calling party in the database, wherein the performing comprises sending a query with a number of the called party to the database.

4. The method of claim 1, comprising:
    performing a lookup of the information associated with the calling party in the database, wherein the performing comprises:
        returning generic information when the information is not intended for the called party.

5. The method of claim 1, wherein the additional information comprises:
    the alert of an occurrence of an event.

6. The method of claim 1, wherein the information comprises:
    information from a service provider.

7. The method of claim 1, wherein the additional information comprises:
    information of a situation from an emergency service provider.

8. The method of claim 1, comprising:
    receiving, by the device, the information and the additional information from the database.

9. The method of claim 8, wherein the receiving of the information and the additional information from the database comprises:
    receiving via an Ethernet port of the device.

10. The method of claim 8, wherein the receiving of the information and the additional information from the database comprises:
    receiving via at a universal serial bus port of the device.

11. The method of claim 1 comprising:
    receiving a call from the calling party.

12. The method of claim 11, wherein the receiving of the call from the calling party comprises:
    receiving the call at a telephone wire port of the device.

13. The method of claim 1, comprising:
    forwarding, by the device, the information and the additional information to a called party using a wireless communication protocol, wherein the forwarding is performed via a wireless access port.

14. The method of claim 1, wherein the database comprises:
    a calling name database.

15. A system, comprising:
    a device configured to:
        identify, by a device, information associated with a calling party when a name of the calling party is located in a database;
        determine additional information exists for a called party device comprising an alert that identifies occurrence of an event associated with the called party device; and
        provide the information associated with the calling party to a called party and additional information associated with a called party to a called party device when the additional information is an alert intended for the called party device, wherein the provided information and the additional information comprises a status associated with an existing order fulfilled by a service provider.

16. The system of claim 15, comprising:
    performing a lookup of the information associated with the calling party in the database, wherein the performing comprises at least one of:
        send a query with the name of the calling party to the database;
        send a query with a number of the called party to the database; and
        return generic information when the information is not intended for the called party.

17. The system of claim 15, wherein one or more of the information and the additional information comprises at least one of:
    an alert of an occurrence of an event;
    information from a service provider; and
    information of a situation from an emergency service provider.

18. The system of claim 15, wherein the device is configured to:
    receive a call from the calling party.

19. The system of claim 15, wherein the at least one database comprises:
    a calling name database.

20. A non-transitory computer readable medium comprising instructions that when read by a processor cause the processor to perform:
    identifying, by a device, information associated with a calling party when a name of the calling party is located in a database;

determining additional information exists for a called party device comprising an alert identifying occurrence of an event associated with the called party device;

providing, by the device, the information associated with the calling party and the additional information associated with the called party device; and wherein the provided information and the additional information comprises a status associated with an existing order fulfilled by a service provider.

* * * * *